(12) United States Patent
Koizumi (10) Patent No.: US 6,519,227 B1
(45) Date of Patent: Feb. 11, 2003

(54) W-CDMA ANALYZING APPARATUS, METHOD OF DISPLAYING RESULTS OF W-CDMA ANALYSIS, AND RECORDING MEDIUM CARRYING RECORD OF PROGRAM FOR DISPLAYING RESULTS OF W-CDMA ANALYSIS

(75) Inventor: Satoshi Koizumi, Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 09/442,272

(22) Filed: Nov. 17, 1999

(30) Foreign Application Priority Data

Nov. 18, 1998 (JP) .......................................... 10-344918
Oct. 1, 1999 (JP) .......................................... 11-282101

(51) Int. Cl.[7] .......................... G01R 31/08; G06F 11/00
(52) U.S. Cl. ........................ 370/241; 370/335; 370/342
(58) Field of Search .................................. 370/320, 335, 370/342, 241; 455/423, 424, 425

(56) References Cited

U.S. PATENT DOCUMENTS 5,619,524 A * 4/1997 Ling et al. .................. 375/200
6,144,860 A * 11/2000 Komatsu .................... 455/522
6,219,340 B1 * 4/2001 Cutler et al. ................ 370/241

* cited by examiner

Primary Examiner—Thanh Cong Le
Assistant Examiner—Tuan Tran
(74) Attorney, Agent, or Firm—Lowe Hauptman Gilman & Berner, LLP (57) ABSTRACT

A W-CDMA analyzing apparatus and a method of displaying results of W-CDMA analysis includes a signal analyzing unit for measuring received signal power in each communication channel of a received signal and a display unit for displaying the measured power value in each communication channel in association with the short code number of each communication channel. The display unit, in drawing and displaying a bar graph with the short code numbers related to the axis of abscissas and the measured power values related to the axis of ordinates, has a plurality of scales, the division each thereof corresponding to each symbol rate, allocated to the axis of abscissas and produces the bar graph indicating the power values such that each bar width is the same in size as the division of the scale corresponding to the symbol rate.

4 Claims, 6 Drawing Sheets

| Symbol Rates (ksps) | Number of Divisions |
|---|---|
| 1024 | 4 |
| 512 | 8 |
| 256 | 16 |
| 128 | 32 |
| 64 | 64 |
| 32 | 128 |

W-CDMA ANALYZING APPARATUS, METHOD OF DISPLAYING RESULTS OF W-CDMA ANALYSIS, AND RECORDING MEDIUM CARRYING RECORD OF PROGRAM FOR DISPLAYING RESULTS OF W-CDMA ANALYSIS

BACKGROUND OF THE INVENTION

1. Technical Field of the Invention

The present invention relates to W-CDMA analysis to measure and analyze the power value contained in a transmitted and received signal in each communication channel in a mobile communication system and the like on the W-CDMA system and also relates to display of results of the analysis.

2. Related Art

CDMA (Code Division Multiple Access) is a system to divide a communication path into a plurality of communication channels by assigning a specific code to each individual communication path thereby modulating the carrier wave with the code. The mobile communication system on the CDMA system is excellent in terms of communication quality and put to practical use also in Japan. Recently, development is being made of the mobile communication system employing W (Wideband)-CDMA system capable of transmitting a mixture of voice, image, and various other signals to meet the demands for multimedia applications and others.

One of the characteristic features of the W-CDMA is its capability of multi-rate transmission. For example, it can provide a service at a slow transmission rate for users who want to transmit and receive only a voice signal and provide a service at a high speed transmission rate for user who want to transmit and receive image data and the like at high speeds.

In the W-CDMA system, in general, a pseudo random (PN) code is used to realize spread spectrum and the PN signal is generated on the receiver side to de-spread the data spread on the transmitter side. There are short codes with low cycles and long codes with high cycles in the PN codes, and different short codes are set corresponding to individual communication channels.

The level of the spreading signal spread by using such codes is lowered to 1/100 or so of the level of the original signal. Therefore, when making analysis of power of a received signal, code domain power analysis is generally used in which measurement is made for each communication channel.

Figure 5:
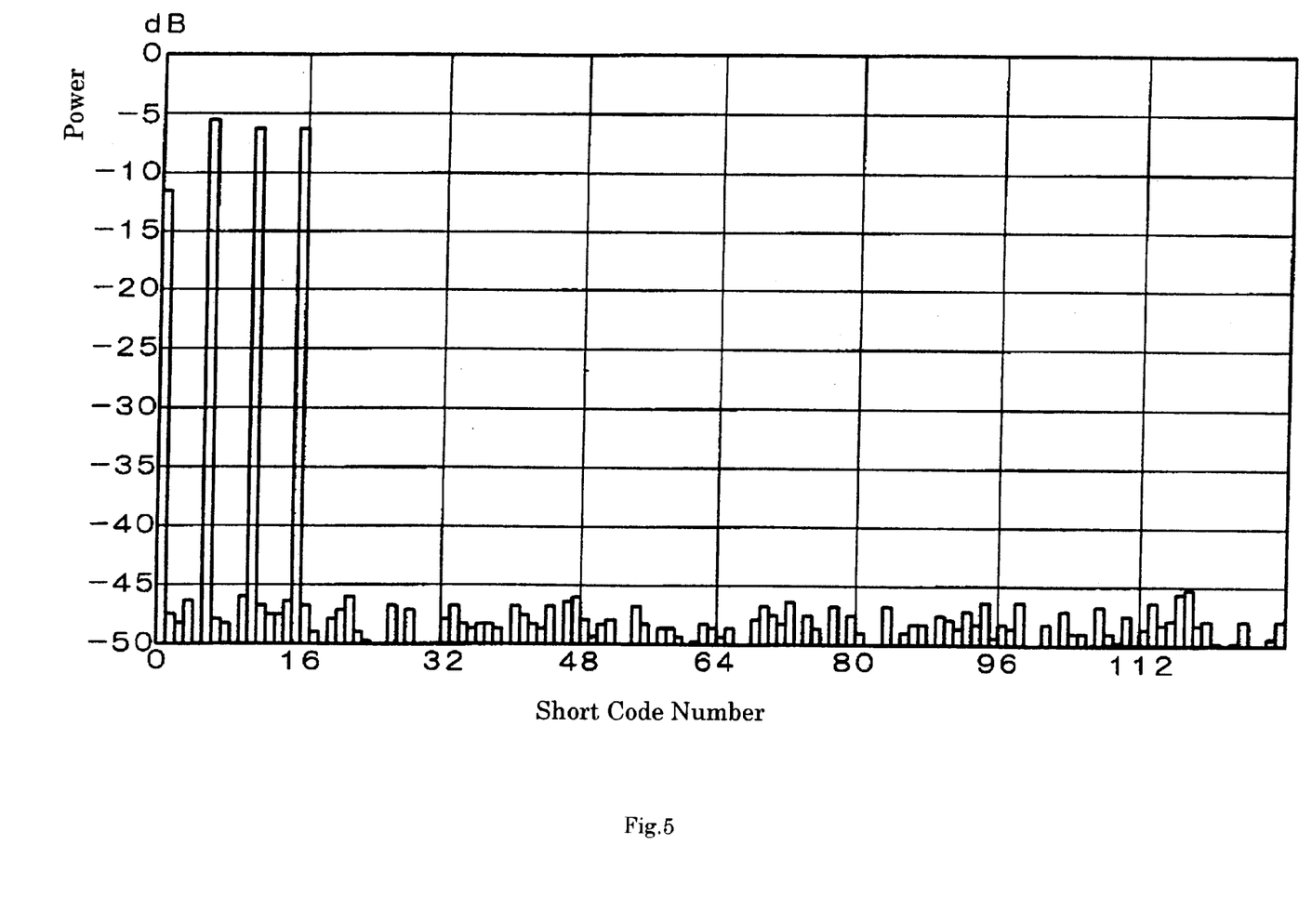
FIG. 5 is a drawing showing a display example of results of code domain power analysis in a prior art example.

FIG. 5 is a drawing showing a display example of results of code domain power analysis in the conventional method, in which there are shown results of measurement of the power value for each short code contained in a received signal that was obtained by receiving a radio wave transmitted from a base station or a mobile station. Referring to FIG. 5, the axis of abscissas represents the short code numbers assigned to individual short codes and the axis of ordinates represents the power values in the communication channels corresponding to the short codes. For example, it is known from the drawing that there are used four communication channels corresponding to four short codes specified by the short code numbers "0", "5", "10", and "15" and what the power value in each of the communication channel is.

However, in the above display example showing results of conventional code domain power analysis, though the short code number of each channel used for signal transmission can be known, the symbol rate (transmission rate) of each channel cannot be known. Specifically, while multi-rate transmission is possible in communications on the W-CDMA system as described above, the symbol rate is required to be known in analyzing the measured power value. Therefore, it is convenient for the user if the symbol rate can be known related with the short code number corresponding to the measured power value.

SUMMARY OF THE INVENTION

The present invention was made in view of the above described problem and it is an object of the invention to provide a W-CDMA analyzing apparatus as well as a method of displaying results of W-CDMA analysis making it possible at the time of power measurement to know the symbol rate in connection with the code number and a recording medium carrying record of a program for displaying results of W-CDMA analysis.

The present invention may include: a frequency conversion unit, which receives a signal transmitted and received in communication employing the W-CDMA system, for converting the received signal into an intermediate-frequency signal; a signal analysis unit, which applies a predetermined spreading demodulation process to an intermediate-frequency signal outputted from the frequency conversion unit, for calculating the power value of each pseudo random code; and a display unit for displaying the power value of the signal for each of the pseudo random codes calculated by the signal analysis unit in such a way that the power value is related to the code number assigned to each of the pseudo random codes and the value of the symbol rate corresponding to each of the pseudo random codes is discernible.

According to the W-CDMA analyzing apparatus designed as described above, when a frequency conversion process is applied to a signal transmitted and received in communication employing the W-CDMA system and then the power value of each of the pseudo random codes is calculated and the results of calculation are displayed, the display is made in such a way that the power value is related with the code number of the pseudo random code and the value of the symbol rate corresponding to each pseudo random code is discernible.

Accordingly, it becomes possible to know the power value corresponding to each pseudo random code and the corresponding symbol rate at the same time.

In the invention described above, the display unit may set the bar width of the bar graph in proportion to the value of the symbol rate while displaying the power value corresponding to each of the code numbers in the form of a bar graph with the code number related to one of two axes orthogonal to each other and the power value related to the other axis.

Specifically, by setting the bar width of the bar graph indicating the power value in proportion to the value of the symbol rate when the display is made in the form of a bar graph with the code number related to one of two axes orthogonal to each other and the power value related to the other axis, it is made easy for the user, when measuring the power value, to relate the code number of the pseudo random code with the symbol rate of the corresponding communication channel.

In the invention described above, the symbol rate corresponding to the scale having the division thereof in agreement with the bar width of the bar graph may be set as the symbol rate of the communication channel for which the power value was measured while one of the axes related with the code number is provided, along the same, with a plurality of scales each thereof having the division of the scale corresponding to each symbol rate.

It is an advantage, when a display is made with the bar width of the bar graph varied as described above, that there are provided along the axis corresponding to the code number a plurality of scales having divisions of the scale in proportion to their respective symbol rates. By specifying the division of the scale having the same size as the bar width of the bar graph, accurate identification of the corresponding symbol rate can be made.

In the invention described above, the display unit may make different coloring according to the value of the symbol rate corresponding to the communication channel while providing a predetermined graph display with the code number related to one of two axes orthogonal to each other and the power value related to the other axis.

As described above, apart from providing a display with the symbol rate related to the bar width of the bar graph, giving different coloring according to the value of the symbol rate when providing a bar graph or other graph display can also relates the code number of the pseudo random code with the symbol rate of the corresponding communication channel.

The present invention my include a method of displaying results of W-CDMA analysis for displaying results of measurement of the power value of signal for each communication channel included in a received signal, and it includes the step of,—displaying the power value of each pseudo random code corresponding to each of the communication channels as related to the code number assigned to each of the pseudo random codes so that the value of the symbol rate of the communication channel is discernible.

The invention described above may include the step of: setting the bar width of the bar graph in proportion to the value of the symbol rate when the magnitude of the power value corresponding to each of the code numbers is displayed in the form of a bar graph with the code number related to one of two axes orthogonal to each other and the power value related to the other axis.

The invention described above may also include the step of: setting the symbol rate corresponding to the scale having the division thereof in agreement with the bar width of the bar graph as the symbol rate of the communication channel for which the power value was measured while one of the axes related with the code number is provided, along the same, with a plurality of scales each thereof having the division of the scale corresponding to each symbol rate.

The invention described above may further include the step of: providing a predetermined graph display with the code number related to one of two axes orthogonal to each other and the power value related to the other axis and, in the meantime, giving different coloring according to the value of the symbol rate corresponding to the communication channel when the power value corresponding to each of the pseudo random codes is displayed.

The present invention may also include a computer-readable medium including program instructions for having the computer execute display of results of analysis to display results of measurement of the power value for each communication channel included in a received signal by performing the step of: displaying the power value for each pseudo random code corresponding to each of the communication channels as related to the code number assigned to each of the pseudo random codes and such that the value of the symbol rate of the communication channel is discernible.

The invention described above may further include program instructions by performing the step of: setting the bar width of the bar graph in proportion to the value of the symbol rate when the power value corresponding to each of the code numbers is expressed in the form of a bar graph with the code number related to one of two axes orthogonal to each other and the power value related to the other axis.

The invention described above may include program instructions by performing the step of setting the symbol rate corresponding to the scale having the division thereof in agreement with the bar width of the bar graph as the symbol rate of the communication channel for which the power value was measured while one of the axes related with the code number is provided, along the same, with a plurality of scales each thereof having the division of the scale corresponding to each symbol rate.

The invention described above may also include program instructions by performing the step of providing a predetermined graph display with the code number related to one of two axes orthogonal to each other and the power value related to the other axis and, in the meantime, giving different coloring according to the value of the symbol rate corresponding to the communication channel when the power value corresponding to each of the pseudo random codes is displayed.

The present invention may include a W-CDMA analyzing apparatus including: a frequency conversion device that receives a signal transmitted and received in communication employing the W-CDMA system and converts the received signal into an intermediate-frequency signal; a signal analysis device that applies a predetermined spreading demodulation process to an intermediate-frequency signal outputted from the frequency conversion unit and calculates the power value of each pseudo random code; and a display device that displays the power value of the signal for each of the pseudo random codes calculated by the signal analysis unit in such a way that the power value is related to the code number assigned to each of the pseudo random codes and the value of the symbol rate corresponding to each of the pseudo random codes is discernible.

In the invention described above, the display device may set the bar width of the bar graph in proportion to the value of the symbol rate while displaying the power value corresponding to each of the code numbers in the form of a bar graph with the code number related to one of two axes orthogonal to each other and the power value related to the other axis.

In the invention described above, the symbol rate corresponding to the scale having the division thereof in agreement with the bar width of the bar graph may be set as the symbol rate of the communication channel for which the power value was measured while one of the axes related with the code number is provided, along the same, with a plurality of scales each thereof having the division of the scale corresponding to each symbol rate.

In the invention described above, the display device may make different coloring according to the value of the symbol rate corresponding to the communication channel while providing a predetermined graph display with the code number related to one of two axes orthogonal to each other and the power value related to the other axis.

DESCRIPTION OF THE PREFERRED EMBODIMENTS

Figure 1:
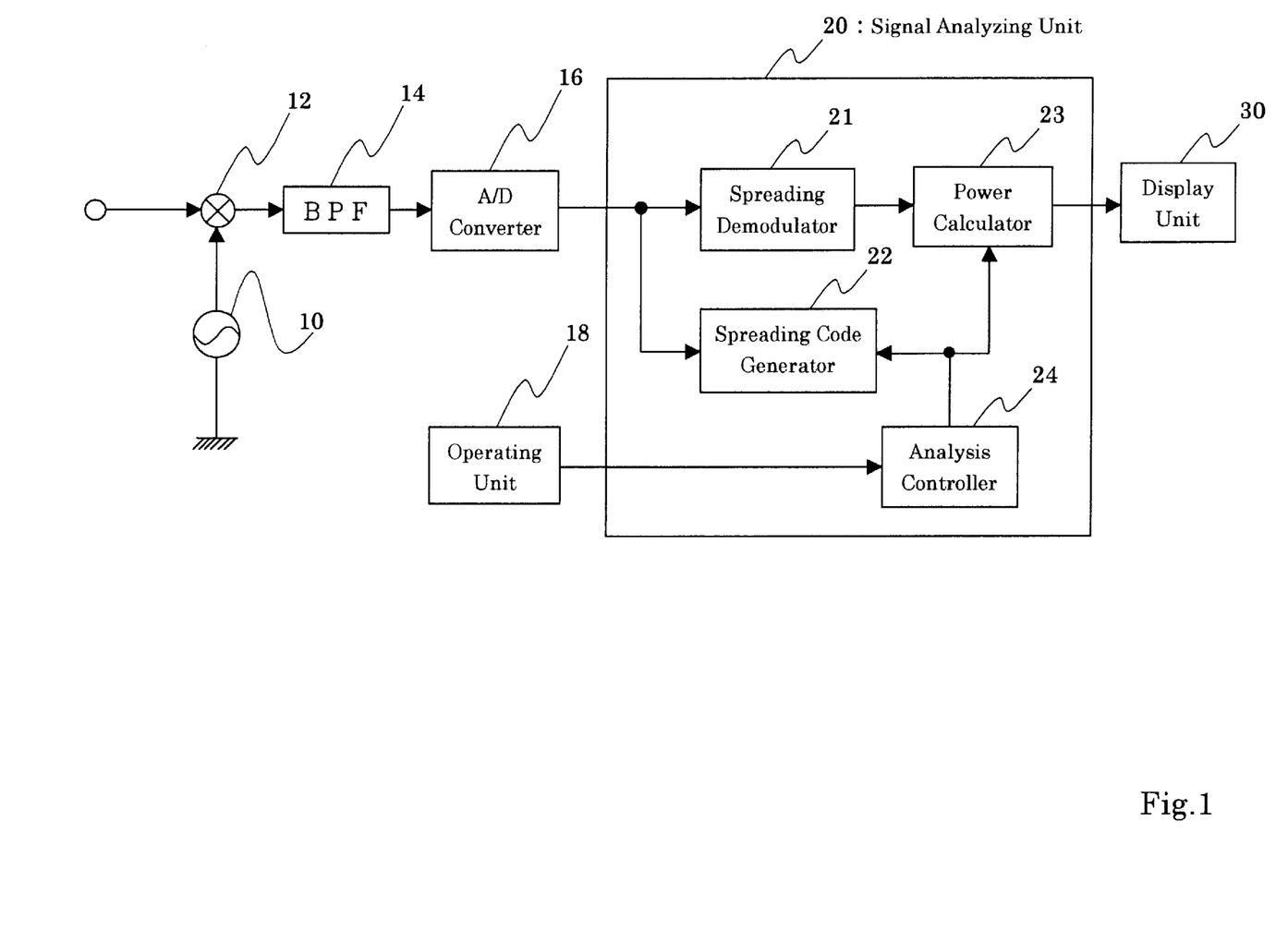
FIG. 1 is a drawing showing a configuration of a W-CDMA analyzing apparatus of an embodiment.

An embodiment having the present invention applied thereto will be described with reference to the accompanying drawings. FIG. 1 is a drawing showing structure of a W-CDMA analyzing apparatus of an embodiment, in which there is shown a configuration for performing power measurement on a received signal through the W-CDMA system for each communication channel.

The W-CDMA analyzing apparatus shown in FIG. 1 includes a local oscillator 10, a frequency converter 12, a band-pass filter (BPF) 14, an analog-to-digital (A/D) converter 16, a signal analyzing unit 20, and a display unit 30.

The local oscillator 10 generates a predetermined local signal for use in frequency conversion. The frequency converter 12 mixes the local signal output from the local oscillator 10 and a received input signal on the WCDMA system to thereby output an analogue intermediate frequency (IF) signal as the difference between them. The frequency of the IF signal is a frequency that can be converted into digital data by the A/D converter 16 in the rear stage and the frequency is required to include a band of the signal transmitted and received through the W-CDIVIA system (for example, 20 MHz in the case where the symbol rate is 2 Mbps). The band-pass filter 14 performs a band limiting process on the IF signal output from the frequency converter 12 to eliminate abasing components included in the IF signal. The A/D converter 16 converts the input IF signal into digital data so that various processes may be made in the signal-analyzing unit 20 in the rear stage.

The signal analyzing unit 20 calculates power of the received signal employing the W-CDMA system for each communication channel on the basis of the IF signal converted into digital data by the A/D converter 16. While there is established a communication channel corresponding to each short code in communications employing the W-CDMA system, the signal analyzing unit 20 calculates the power value for each short code. The signal-analyzing unit 20 includes a spreading demodulator 21, a spreading code generator 22, a power calculator 23, and an analysis controller 24.

The spreading demodulator 21 applies an de-spreading process (spreading demodulation) to a received signal, which is spreading demodulated by the use of each of the short code and long code, and recovers the signal before being demodulated on the transmitter side. The spreading code generator 22 generates the long code and short code used in the despreading process by the spreading demodulator 21.

The power calculator 23 calculates the power value for each communication channel corresponding to each short code by the use of the data obtained by the de-spreading processing in the spreading demodulator 21. For example, considering a case where QPSK modulation is used for a down link of a mobile (radio) communication service employing the W-CDMA system, the power calculator 23 separates the in-phase component I and the orthogonal-component Q of the spreading-demodulated signal and then obtains the sum of the squares of each data, I2+Q2, to thereby calculate the power value for each communication channel corresponding to each short code.

The analysis controller 24, by controlling an operating unit 18, sends an instruction to the spreading code generator 22 to sequentially generate short codes corresponding to designated short code numbers and also sends an instruction to the power calculator 23 to carry out the power calculation process by the use of the data obtained through spreading demodulation processing corresponding to each short code. Thus, calculation of the power value for the communication channel corresponding to each of a plurality of short codes is carried out in the power calculator 23 and the obtained power value together with the short code number are outputted from the signal analyzing unit 20.

The display unit 30 displays on its screen the power values calculated by the signal-analyzing unit 20 in a predetermined format. For example, a bar graph is provided with the calculated power values taken along the axis of ordinates and the short code numbers taken along the axis of abscissas.

Figure 2:
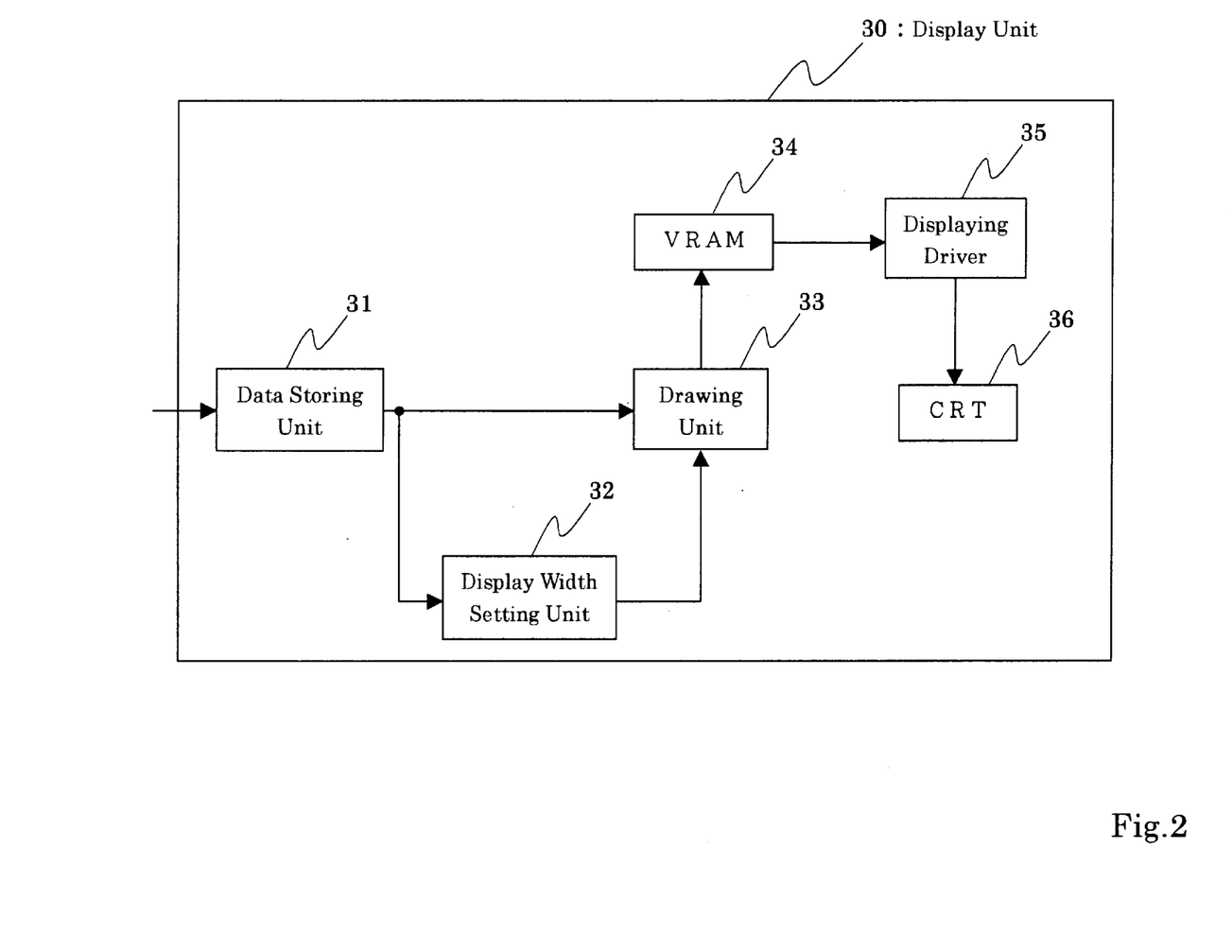
FIG. 2 is a drawing showing a detailed configuration of a display unit shown in FIG. 1.

FIG. 2 is a drawing showing detailed structure of the display unit 30 shown in FIG. 1. As shown therein, the display unit 30 includes a data storing unit 31, a display width setting unit 32, a drawing unit 33, a VRAM (video PLAW 34, a displaying driver 35, and a CRT (cathode ray tube) 36.

The data storing unit 31 receives the power value data calculated by the power calculator 23 within the signal analyzing unit 20 in order of the short code number and stores the data in the order they are inputted. The display width setting unit 32, in delineating the power value for each communication channel corresponding to each short code in the form of the bar graph, sets each displayed bar width of the bar graph as related to the symbol rate in each communication channel. For example, it is set so that the displayed bar width becomes small when the symbol rate is low and the displayed bar width becomes large when, conversely, the symbol rate is high.

Figure 3:
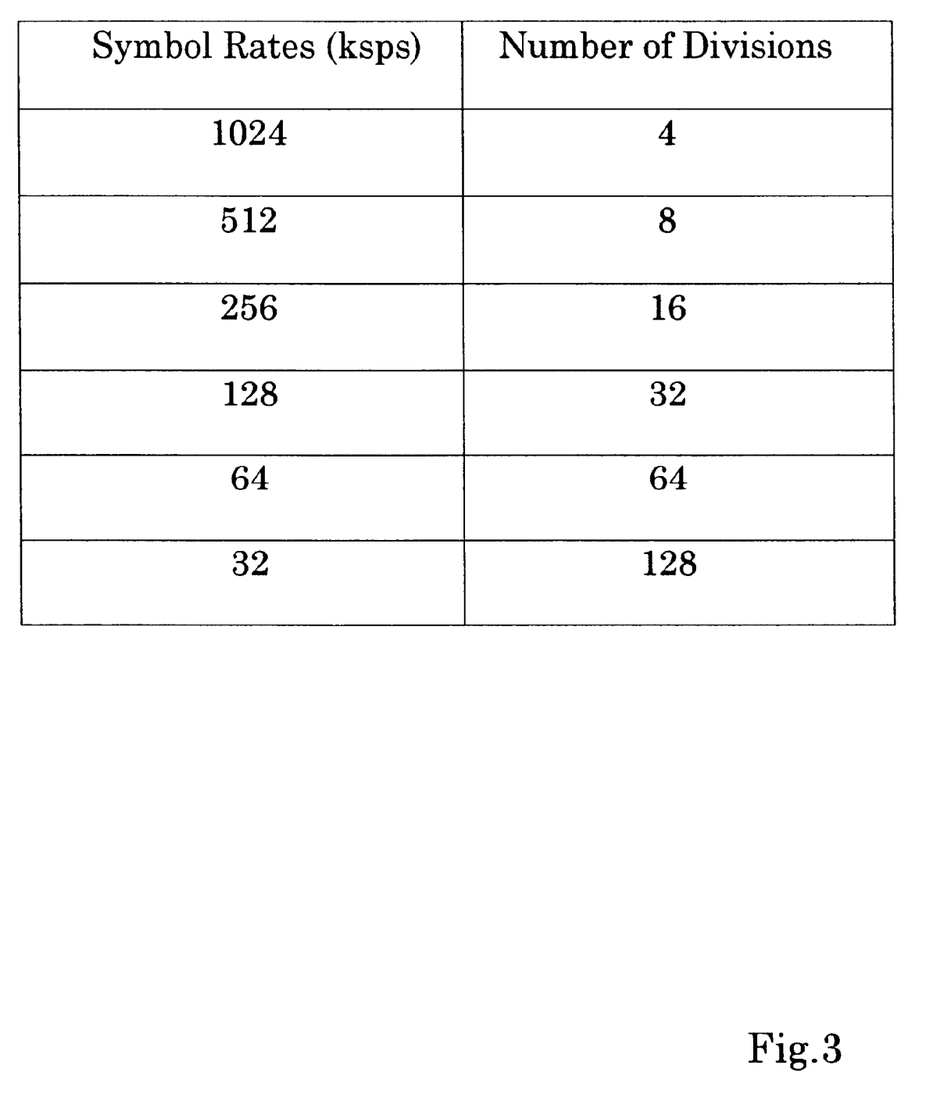
FIG. 3 is a drawing showing relationship between symbol rates and number of divisions.

FIG. 3 is a drawing showing the relationship between the symbol rate and the number of divisions along the axis of abscissas, in which one divisional region corresponds to one bar width of the bar graph. For example, in the case where the symbol rate is 1024 ksps, one bar representing the power value corresponding to one short code is assigned to one divisional region given by dividing the overall axis of abscissas by four and the overall axis of abscissas allows the power values for communication channels for four short codes corresponding to short code numbers "0"–"3 " to be displayed therein. Further, in the case where the symbol rate is 512 ksps, one bar representing the power value corresponding to one short code is assigned to each divisional region given by dividing the overall axis of abscissas by eight, and the overall axis of abscissas allows the power values for communication channels for eight short codes corresponding to short code numbers "0"–"7" to be displayed therein. The same may be said of other symbol rates, that is, according as the symbol rate becomes one-half, the number of divisions of the axis of abscissas becomes doubled and, hence, the number of displayable communication channels included in the overall axis of abscissas is increased, but the bar width of the bar graph indicating the power value for each communication channel corresponding to each divisional region is halved.

The drawing unit 33 reads out data of power values stored in the data storing unit 31 and draws an image of bar graph in which the axis of abscissas represents the short code numbers corresponding to the short codes and the axis of ordinates represents the power values corresponding to the short codes and, thereupon, writes the data of drawing in the corresponding region on one screen of the VRAM 34. Further, in the process of the drawing, the value of the display width indicating the symbol rate corresponding to each short code number set by the display width setting unit 32 is used as the bar width of the bar graph corresponding to each short code number. The displaying driver 35 reads out the image data stored in the VRAM 34 in a scanning direction to generate a video signal for display and allows the results of code domain power analysis to be displayed in a predetermined format on the screen of the CRT 36.

Figure 4:
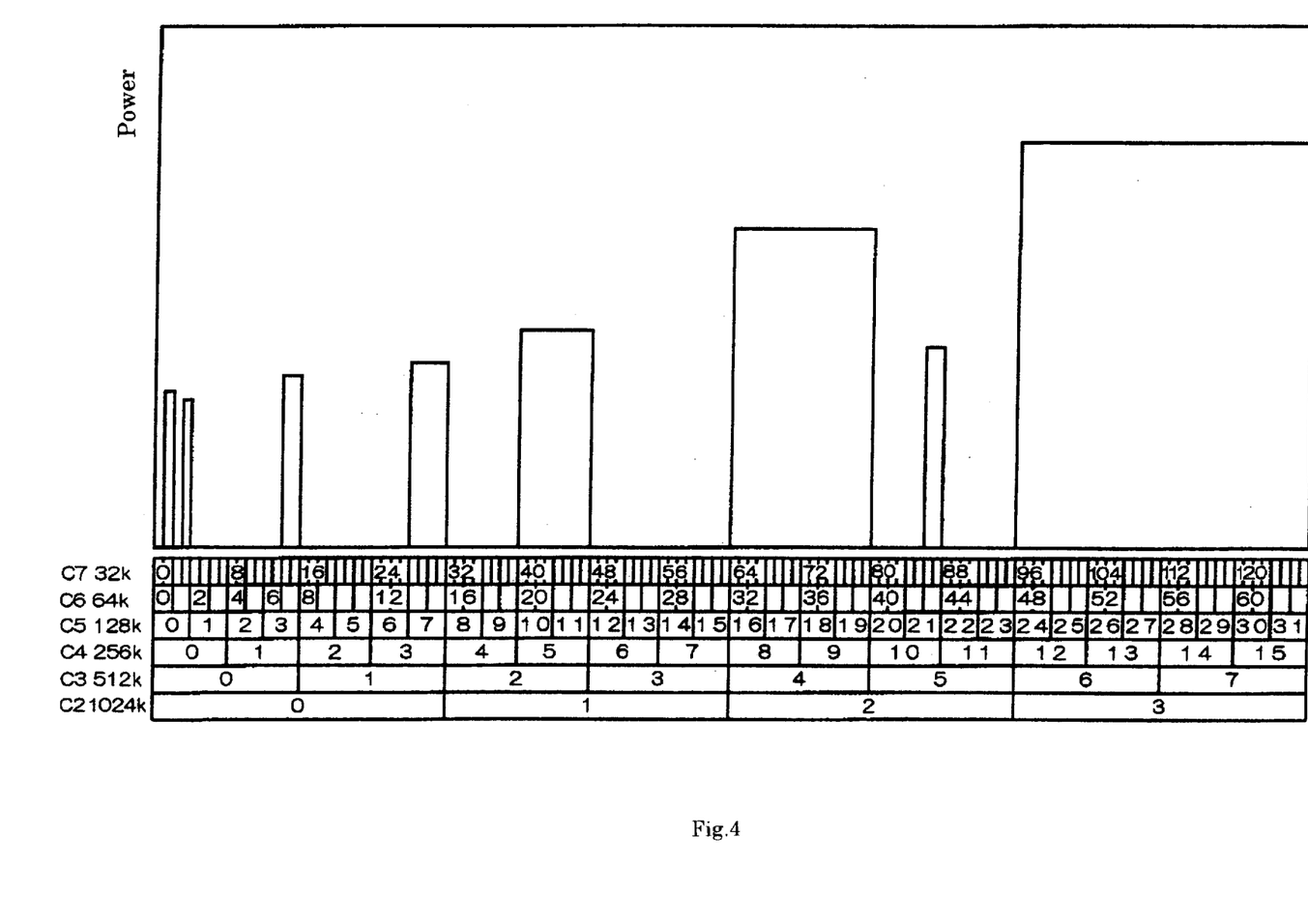
FIG. 4 is a drawing showing a display example of results of code domain power analysis according to the embodiment.

FIG. 4 is a drawing showing a display example of the results of code domain power analysis. In the graph delineating the results of analysis shown in FIG. 4, the axis of abscissas corresponds to the short code numbers and the axis of ordinates corresponds to the power values. The axis of abscissas has a plurality of scales each thereof being set to have different number of divisions for each of different symbol rates. One short code number corresponds to one divisional region and different numbers of short code numbers are assigned to each of different symbol rates. For example, "C7 32k" indicates that the symbol rate is 32 ksps and, in the scale corresponding thereto, one divisional region obtained by dividing the overall axis of abscissas by 128 indicates the display width corresponding to one communication channel. Further, the numbers attached to the divisions of the scale denote the short code numbers.

According to the graph of analysis results shown in FIG. 4, eight communication channels are included in the received signal, the details of which are as follows:

(1) two communication channels of a symbol rate of 32 ksps are included and their respective short code numbers are "1" and "3";

(2) two communication channels of a symbol rate of 64 ksps are included and their respective short code numbers are "7" and "43";

(3) one communication channel of a symbol rate of 128 ksps is included and its short code number is "7";

(4) one communication channel of a symbol rate of 256 ksps is included and its short code number is "5";

(5) one communication channel of a symbol rate of 512 ksps is included and its short code number is "4"; and (6) one communication channel of a symbol rate of 1024 ksps is included and its short code number is "3".

Figure 6:
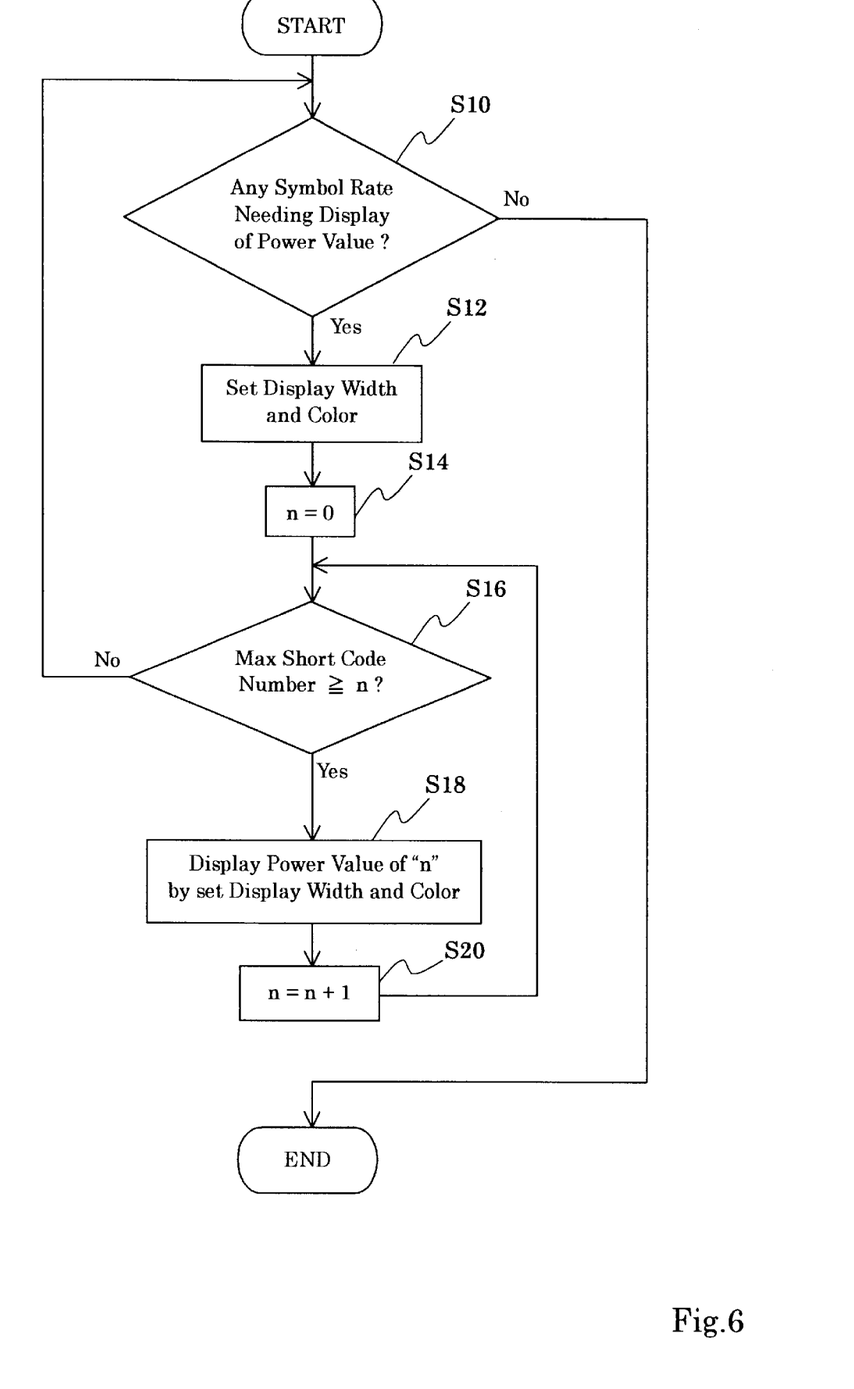
FIG. 6 is a flowchart showing an example of operation according to the embodiment.

The operation of the W-CDMA analyzing apparatus according to the present embodiment will be described with reference to the flowchart shown in FIG. 6. First, the drawing unit 33 determines whether there is left in the data stored in the data storing unit 31 any symbol rate for which the power value is required to be displayed (S 10). If there is left in the data stored in the data storing unit 31 no symbol rate for which the power value is required to be displayed (S 10, No), the process is terminated because the power value displays are all finished. If there are left any symbol rates for which the power value is required to be displayed (S 10, Yes), the symbol rate whose power value is to be displayed is determined and the display width and display color of the bar graph corresponding to the symbol rate are set by the display width setting unit 32 (S 12).

Then, before the power value for each short code within the symbol rate is displayed, the variable "n" indicating the short code is set to 0 n(S 14). Then, the drawing unit 33 compares the variable "n" with the maximum value of the short code numbers (S 16). When the variable "n" exceeds the maximum value of the short code numbers (S 16, No), it means that all the short codes within the symbol rate as the objects of display are already displayed, and hence it returns to determination as to whether there are left any symbol rates for which the power value is required to be displayed (S 10). When the variable "n" is not greater than the maximum value of the short code number (S 16, Yes), the drawing unit 33, in order to display the power value of the short code "n" on the CRT 36 in the decided display width and display color, writes the data to be displayed in the VRAM 34 (S 18). The data for display written in the VRAM 34 is displayed on the CRT 36 through the displaying driver 35. Then, the counter variable "n" is incremented by 1 (S 20) and the process returns to the comparison of the value "n" with the maximum value of the short code numbers (S 16).

In the W-CDMA analyzing apparatus of the present embodiment, as described in the foregoing, when the power value for each short code is displayed in a bar graph with the short code number related with the axis of abscissas, the display width is set to be proportional to the value of the symbol rate. Hence, when measured power values and short code numbers are displayed in association with each other, the symbol rate of each communication channel can be discerned at the same time. Since, specifically, one scale is prepared for each symbol rate along the axis of abscissas and the division of the scale is set to the value proportional to the symbol rate to assign each short code number thereto, the user is enabled to know the relevant symbol rate by specifying the division of the scale having the size in agreement with the bar width of the bar graph and, moreover, enabled to know the short code number corresponding to the communication channel for which the power value is measured by reading the numeral assigned to the position on the scale corresponding to the bar graph.

The present invention is not limited to the above described embodiment but various modifications can be carried out within the scope of the spirit of the present invention. For example, although the bar width of the bar graph indicating the power value corresponding to each short code number was set to be proportional to the value of the symbol rate in displaying the results of code domain power analysis in the W-CDMA analyzing apparatus of the embodiment, some other method of display may be used provided that the symbol rate is displayed therein in a discernible condition.

For example, in displaying the power value corresponding to each short code number in the form of a bar graph, the color of each bar may be set according to the symbol rate. Setting of the color corresponding to each symbol rate can be achieved, for example, by changing the display width setting unit 32 within the display unit 30, shown in FIG. 2, into a display color setting unit. Thus, also by changing the color of the bar graph indicating the measurement results of the power value, it is made possible, at the time of the received power measurement, to discern the short code number and the symbol rate of the communication channel corresponding to the short code number in association with each other.

Further, referring to the display of results of analysis shown in FIG. 4, different coloring may be made for each of different symbol rates. Concretely, the bars of the bar graphs shown in FIG. 4 may be colored differently for different symbol rates and at the same time pluralities of the scales arranged along the axis of abscissas may be given the colors corresponding to their respective symbol rates. Thus, by giving the colors given to the bars of the bar graph also to the scales corresponding to the symbol rates, the symbol rate can be known only by looking for the scale in the corresponding color, not by looking for the corresponding scale by reference to the bar width of the bar graph. Therefore, erroneous reading of the symbol rate or the short code number can be prevented and accurate analytical work can be performed.

Further, in order to realize the W-CDMA analyzing apparatus in the present embodiment the following method can be used.

A media reading unit of a computer including a CPU, a hard disk drive, and a media (such as a floppy disk and a CD-ROMD reading device may be made to read a medium carrying record of a program for realizing the above units and the program may be installed in the hard disk. A W-CDMA analyzing apparatus can also be realized by such a method.

[Effects of the Invention]

According to the present invention, as described above, when the power value corresponding to each pseudo random code in a received signal in communication employing the W-CDMA system is displayed, the display is made with the code number of the pseudo random code and the power value related with each other and, in addition, so that the value of the symbol rate corresponding to each pseudo random code may be discernible. Therefore, in the power measurement, it is made easy for the user to relate the code number of the pseudo random code with the symbol rate of the corresponding communication channel.

What is claimed is:

1. A W-CDMA analyzing apparatus comprising:
 a frequency conversion means, which receives a signal transmitted and received in communication employing the W-CDMA system, for converting the received signal into an intermediate-frequency signal;
 a signal analysis means, which applies a predetermined spreading demodulation process to an intermediate-frequency signal outputted from said frequency conversion means, for calculating the power value of each pseudo random code; and
 a display means for displaying the power value of said signal for each of said pseudo random codes calculated by said signal analysis means in such a way that the power value is related to the code number assigned to each of said pseudo random codes and the value of the symbol rate corresponding to each of said pseudo random codes is discernible;
 wherein, said display means sets the bar width of the bar graph in proportion to the value of the symbol rate while displaying said power value corresponding to each of said code numbers in the form off a bar graph with said code number related to one of two axes orthogonal to each other and said power value related to the other axis and the symbol rate corresponding to the scale having the division thereof in agreement with the bar width of said bar graph is set as the symbol rate of the communication channel for which the power value was measured while one of said axes related with said code number is provided, along the same, with a plurality of scales each thereof having the division of the scale corresponding to each symbol rate.

2. A method of displaying results of W-CDMA analysis for displaying results of measurement of the power value of signal for each communication channel included in a received signal, comprising the steps of:
 displaying the power value of each pseudo random code corresponding to each of said communication channels as related to the code number assigned to each of said pseudo random codes so that the value of the symbol rate of said communication, channel is discernible;
 setting the bar width of the bar graph in proportion to the value of said symbol rate when the magnitude of said power value corresponding to each of said code numbers is displayed in the form, of a bar graph with said code number related to one of two axes orthogonal to each other and the power value related to the other axis; and
 setting the symbol rate corresponding to the scale having the division thereof jinn agreement with the bar width of said bar graph as the symbol rate of the communication channel for which the power value was measured while one of said axes related with said code number is provided, along the same, with a plurality of scales each thereof having the division of the scale corresponding to each symbol rate.

3. A computer-readable medium comprising program instructions fox having the computer execute display of results of analysis to display results of measurement of the power value for each communication channel included in a received signal by performing the steps of:
 displaying the power value for each pseudo random code corresponding to each of said communication channels as related to the code number assigned to each of said pseudo random codes arid such that the value of the symbol rate of said communication channel, is discernible;
 setting the bar width of the bar graph in proportion to the value of said symbol rate when said power value corresponding to each of said code numbers is expressed in the form of a bar graph with said code number related to one of tyro axes orthogonal to each other and said power value related to the other axis; and
 setting the symbol rate corresponding to the scale having the division thereof in agreement with the bar width of said, bar graph as the symbol rate of the communication channel fox which the power value was measured while one of said axes related with said code number is provided, along the same, with a plurality of scales each thereof having the division of the scale corresponding to each symbol rate.

4. A W-CDMA analyzing apparatus comprising:
 a frequency conversion device that receives a signal transmitted and received in communication employing the W-CDMA system axed converts the received signal into an intermediate-frequency signal;
 a signal analysis device that applies a predetermined spreading demodulation process to an intermediate-frequency signal outputted from said frequency conversion means and calculates the power value of each pseudo random code; and
 a display device that displays the power value of said signal for each of said pseudo random codes calculated by said signal analysis means in such a way that the power value is related to the code number assigned to each of said pseudo random codes and the value of the symbol rate corresponding to each of said pseudo random codes is discernible;

wherein said display device sets the bar width of the bar graph in proportion to the value of the symbol rate while displaying said power value corresponding to each of said code numbers in the form of a bar graph with said code number related to one of two axes orthogonal to each other and said power value related to the other axis and the symbol rate corresponding to the scale having the division thereof in agreement with the bar width of said bar graph is set as the symbol rate of the communication channel for which the power value was measured while one of said axes related with said code number is provided, along the same, with a plurality of scales each, thereof having the division of the scale corresponding to each symbol rate.

* * * * *